United States Patent
Shimanaka et al.

(10) Patent No.: US 9,102,777 B2
(45) Date of Patent: Aug. 11, 2015

(54) EMULSION BINDER, AQUEOUS PIGMENT INK FOR INKJET CONTAINING SAME, AND METHOD FOR PRODUCING EMULSION BINDER

(75) Inventors: Hiroyuki Shimanaka, Tokyo (JP); Yoshikazu Murakami, Tokyo (JP); Shinichio Aoyagi, Tokyo (JP); Atsushi Goto, Kyoto (JP); Hironori Kaji, Kyoto (JP)

(73) Assignees: DAINICHISEIKA COLOR & CHEMICALS MFG. CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 43 days.

(21) Appl. No.: 14/001,824

(22) PCT Filed: Nov. 28, 2011

(86) PCT No.: PCT/JP2011/077293
§ 371 (c)(1),
(2), (4) Date: Aug. 27, 2013

(87) PCT Pub. No.: WO2012/124212
PCT Pub. Date: Sep. 20, 2012

(65) Prior Publication Data
US 2013/0338273 A1    Dec. 19, 2013

(30) Foreign Application Priority Data
Mar. 15, 2011   (JP) .................. 2011-057040

(51) Int. Cl.
| | |
|---|---|
| *G03G 9/00* | (2006.01) |
| *C08F 299/04* | (2006.01) |
| *C09D 11/107* | (2014.01) |
| *C09D 11/322* | (2014.01) |
| *C08F 293/00* | (2006.01) |

(52) U.S. Cl.
CPC ....... *C08F 299/0414* (2013.01); *C08F 293/005* (2013.01); *C09D 11/107* (2013.01); *C09D 11/322* (2013.01); *Y10T 428/2982* (2015.01)

(58) Field of Classification Search
CPC .......................... C09D 11/322; C09D 293/005
USPC .................................................. 523/160, 161
See application file for complete search history.

(56) References Cited

U.S. PATENT DOCUMENTS

2011/0223529 A1*  9/2011  Shimanaka et al. ....... 430/108.4

FOREIGN PATENT DOCUMENTS

| JP | 2002-194037 | 7/2002 |
|---|---|---|
| JP | 2003-520279 | 7/2003 |
| JP | 2004-197090 | 7/2004 |
| JP | 2005-179679 | 7/2005 |
| JP | 2008-019431 | 1/2008 |
| JP | 2008-231130 | 10/2008 |
| JP | 2010-018663 | 1/2010 |
| WO | WO 2009/076567 | 6/2009 |
| WO | WO 2010 013651 | * 2/2010 |
| WO | WO 2010/013651 | 2/2010 |

OTHER PUBLICATIONS

Extended European Search Report, Jun. 17, 2015; European Patent Application No. 11860846.2 (5 pages).

* cited by examiner

*Primary Examiner* — Doris Lee
(74) *Attorney, Agent, or Firm* — Hamre, Schumann, Mueller & Larson, P.C.

(57) ABSTRACT

Disclosed is an emulsion binder containing an A-B block copolymer. The A-B block copolymer has a number average molecular weight of 5,000 to 100,000, and a polydispersity index (weight average molecular weight/number average molecular weight) of not greater than 1.7. The polymer block A has an acid value of 0 to 30 mgKOH/g and a glass transition point of not higher than 60° C. The polymer block B has an acid value of 75 to 250 mgKOH/g. The A-B block copolymer has been neutralized with an alkaline material, and has been allowed to self-emulsify in an aqueous medium to form emulsion particles having an average particle size of 30 to 300 nm.

7 Claims, No Drawings

EMULSION BINDER, AQUEOUS PIGMENT INK FOR INKJET CONTAINING SAME, AND METHOD FOR PRODUCING EMULSION BINDER

TECHNICAL FIELD

This invention relates to an emulsion binder suited as a film component in the inkjet printing method, a water-based inkjet pigment ink containing the emulsion binder, and a process for producing the emulsion binder.

BACKGROUND ART

The application of inkjet printers varies widely with the movement in recent years toward those having higher functions. Their application is expanding further, for example, not only as those for personal use, office use, business use, recording, colored presentation and color photos but also as industrial inkjet printers. For industrial inkjet printers in particular, it is required especially to meet high-speed printing. Concerning water-based pigment inks for use in such inkjet printers, the ultrafine division of pigment particles has proceeded to make improvements in brilliance, color clearness, color density and so on. On the other hand, the miniaturization of ejected droplets (ink droplets) has also proceeded to meet the movement toward printing of higher speed and higher quality through improvements in printer apparatus. These improvements have brought about excellent high-quality image quality for converted papers for inkjet printing, especially photographic papers, wide format papers, and the like. Nonetheless, these improvements have not advanced to such an extent as to apply the inkjet printing method to printing on papers of various qualities. A new problem has arisen especially in that depending on the kind of paper, the printed ink may flake off when rubbed.

In recent years, printing is often applied industrially to various film-shaped base materials made of polyvinyl chloride, polyolefins, PET, polystyrene and the like. It is, therefore, necessary to form printed ink films (printed ink) of high adhesiveness on these film-shaped base materials.

To solve the above-described various problems, a binder that forms printed ink films is added in an ink. There is, accordingly, a need for a film-forming binder that can meet papers of various qualities, can form printed ink films with high adhesiveness to various films, and has good inkjet printability (high-speed printability, ejection stability). It is to be noted that papers and films may hereinafter be collectively referred also to as "base materials".

Incidentally, inks may dry up in printer heads. Inkjet inks are, therefore, required to have resolubility such that they can be easily removed by dissolving or dispersing them with a cleaning solution or the like even when they dry up and stick in the heads.

Under such background circumstances, a variety of film-forming binders have been developed in recent years.

Described specifically, solutions or emulsions that contain water-soluble, acrylic, urethane, vinyl or like polymers, which can act as ordinary film-forming components, are known as binders. However, such water-soluble polymers are soluble in aqueous media for water-based pigment inks, and therefore involve a problem that the inks become higher in viscosity. Further, such water-soluble polymers include those provided with improved water-solubility by containing carboxyl groups at a high concentration and neutralizing them with a neutralizing alkaline material. These polymers are certainly provided with good resolubility, but are mostly dissolved in aqueous media. As a consequence, the inks tend to become still higher in viscosity. Furthermore, the inks may show non-Newtonian viscosity, and may not be ejected smoothly from heads. In addition, because of the inclusion of many carboxyl groups in the polymers, the resulting films may not be provided with good water resistance.

Attempts have also been made to lower the concentration of carboxyl groups in contrast to the above-described approach such that the polymer is lowered in solubility and is particulated to provide a water dispersion or emulsion (polymer emulsion) for use as a binder. Such a binder can provide an ink with lower viscosity, and can also provide the resulting film with good water resistance owing to the low concentration of carboxyl groups in the polymer. Moreover, the polymer itself is hydrophilic so that the resulting film is provided with improved adhesiveness to a base material. However, such a polymer is poor in water solubility, and therefore tends to provide the resulting ink with low resolubility. It is, therefore, necessary to use a water-soluble solvent.

Also proposed as polymer emulsions useful as binders include an emulsion which can be obtained by emulsion polymerization making use of a conventionally-known, low molecular surfactant or reactive surfactant; and self-emulsifiable emulsions each of which can be obtained by conducting polymerization with a carboxyl-containing monomer added in a small amount and then conducting neutralization (see Patent Documents 1 to 3). As the polymers contained in these emulsions are high in molecular weight, the resulting films are provided with improved adhesiveness to base materials. However, the polymers contained in these emulsions become hardly soluble in aqueous media when they are dried up into films. The inks, therefore, tend to be provided with low resolubility.

Prior Art Documents

Patent Documents

Patent Document 1: JP-A-2003-520279
Patent Document 2: JP-A-2004-197090
Patent Document 3: JP-A-2005-179679

DISCLOSURE OF THE INVENTION

Problem to be Solved by the Invention

With such problems of the conventional technologies in view, the present invention has as objects thereof the provision of an emulsion binder capable of preparing a water-based inkjet pigment ink, which has excellent ejection stability, can form printed ink films excellent in water resistance and the adhesiveness to a base material, and can be redissolved and readily removed even when it dries up in an ejection nozzle (head) or the like, and also a process for producing the emulsion binder.

The present invention also has as a further object thereof the provision of a water-based inkjet pigment ink, which has excellent ejection stability, can form printed ink films excellent in water resistance and the adhesiveness to a base material, and can be redissolved and readily removed even when dries up in an ejection nozzle (head) or the like, Means for Solving the Problems The present inventors have conducted an enthusiastic study, and as a result, have come to a solution to the above-described problems by using, as a film-forming binder for an ink, an emulsion binder that contains an acrylic block copolymer (A-B block copolymer) formed of a substantially water-insoluble polymer block A as a highly-adhesive film component and a highly water-soluble polymer block B containing carboxyl groups at a high concentration.

The above-described problems can, therefore, be solved by the present invention to be described hereinafter. Described specifically, according to the present invention, there is provided an emulsion binder comprising an A-B block copolymer formed of a polymer block A and another polymer block B, at least 90 mass % of constituent monomer units of said A-B block copolymer having been derived from at least one (meth)acrylate-based monomer, wherein the A-B block copolymer has a number average molecular weight of 5,000 to 100,000 and a polydispersity index (weight average molecular weight/number average molecular weight) of not greater than 1.7, the polymer block A has an acid value of 0 to 30 mgKOH/g and a glass transition point of not higher than 60° C., the polymer block B has an acid value of 75 to 250 mgKOH/g, and the A-B block copolymer has been neutralized with an alkaline material, and has been allowed to self-emulsify in an aqueous medium to form emulsion particles having a number average particle size of 30 to 300 nm.

According to the present invention, there is also provided a water-based inkjet pigment ink comprising a pigment and a film-forming binder, wherein the film-forming binder is the above-described emulsion binder.

In the present invention, it is preferred that the pigment is at least one pigment selected from the group consisting of Color Index Numbers (C.I.) Pigment Blue 15:3 and 15:4; C.I. Pigment Red 122 and 269; C.I. Pigment Violet 19; C.I. Pigment Yellow 74, 155, 180 and 183; C.I. Pigment Green 7, 36 and 58; C.I. Pigment Orange 43; C.I. Pigment Black 7; and C.I. Pigment White 6 and has a number average primary particle size of smaller than 350 nm, and based on 100 mass % total amount of the ink, the pigment is contained at a content of 4 to 15 mass % and the film-forming binder is contained at a content of 5 to 20 mass %.

According to the present invention, there is also provided a process for producing the above-described emulsion binder, which comprises the following step: subjecting the (meth)acrylate-based monomer to living radical polymerization by using at least an iodine compound as a polymerization initiator compound, thereby synthesizing the A-B block copolymer.

In the present invention, the A-B block copolymer may preferably be synthesized by using, as a catalyst, at least one compound selected from the group that consists of phosphorus-containing compounds consisting of phosphorus halides, phosphite-based compounds and phosphinate compounds, nitrogen-containing compounds consisting of imide-based compounds, oxygen-containing compounds consisting of phenol-based compounds, and hydrocarbon compounds consisting of diphenyl methane-based compounds and cyclopentadiene-based compounds. Further, the living radical polymerization may preferably be conducted at a polymerization temperature of 30 to 50° C.

In the present invention, it is preferred that subsequent to the living radical polymerization in a water-soluble organic solvent, an alkaline material is added for neutralization, and water is then mixed to induce self-emulsification of the A-B block copolymer.

Advantageous Effects of the Invention

The specific block copolymer contained in the emulsion binder according to the present invention is not dissolved but can exist as particles when it exists in an ink. The use of the emulsion binder according to the present invention can, therefore, provide a water-based inkjet pigment ink, which is low in viscosity, is excellent in ejection stability, and can be applied to high-speed printing. Further, the use of the emulsion binder according to the present invention can also prepare a water-based inkjet pigment ink, which can form printed ink films having water resistance and excellent adhesiveness to a base material such as a paper or film. Furthermore, the use of the emulsion binder according to the present invention can also prepare a water-based inkjet pigment ink, which can be redissolved and readily removed (has resolubility) even when it dries up in an ejection nozzle (head) or the like Modes for Carrying out the Invention 1. Emulsion Binder About details of the present invention, a description will hereinafter be made based on modes for carrying out the present invention. The polymer contained in the emulsion binder according to the present invention is an A-B block copolymer, at least 90 mass % of constituent monomer units of which have been derived from at least one (meth)acrylate-based monomer. This A-B block copolymer has s a number average molecular weight of 5,000 to 100,000 and a polydispersity index (weight average molecular weight/number average molecular weight) of not greater than 1.7. The A-B block copolymer contains a polymer block A and another polymer block B. The polymer block A is a polymer block, which has an acid value of 0 to 30 mgKOH/g and a glass transition point of not higher than 60° C, and is substantially insoluble in water. On the other hand, the polymer block B is a polymer block, which has an acid value of 75 to 250 mgKOH/g, and is substantially soluble in water.

In the A-B block copolymer, at least 90 mass %, preferably at least 95 mass % of its constituent monomer units have been derived from at least one (meth)acrylate-based monomer. As the (meth)acrylate-based monomer, one known to date can be used, and no particular limitation is imposed thereon. Specific examples of the (meth)acrylate-based monomer include the (meth)acrylates of aliphatic or alicyclic alcohols, such as methyl (meth)acrylate, n-butyl (meth)acrylate and cyclohexyl (meth)acrylate; (meth)acrylates containing an aromatic ring, such as benzyl (meth) acrylate and phenoxyethyl (meth) acrylate; the (meth)acrylates of glycols, such as methoxyethyl (meth)acrylate, ethoxyethoxyethyl (meth)acrylate and poly(n=2 and more)ethylene glycol (meth)acrylates; hydroxyl-containing (meth)acrylates such as 2-hydroxyethyl (meth)acrylate and 2-hydroxypropyl (meth)acrylate; amino-containing (meth)acrylates such as dimethylaminoethyl (meth)acrylate and diethylaminoethyl (meth) acrylate; oxygen-containing cyclic (meth) acrylates such as glycidyl (meth) acrylate, tetrahydrofuryl (meth)acrylate and oxetanyl (meth)acrylate; fluorine-containing (meth)acrylates such as 1,1,2,2-tetrafluoroethyl (meth)acrylate; styrene macromonomers, silicone macromonomers and poly($\epsilon$-caprolactone) macromonomers, terminals of which are (meth)acrylate groups, respectively; and (meth) acrylates capable of improving light resistance, such as 2-[3-(2H-benzotriazol-2-yl)-4-hydroxyphenyl]ethyl methacrylate and 3,3,5,5-tetramethylpiperidinyl (meth) acrylate.

Insofar as at least 90 mass % of the constituent monomer units have been derived from at least one (meth)acrylate-based monomer, one or more "other addition-polymerizable monomers" may be used together with the (meth)acrylate-based monomer. Specific examples of the "other addition-polymerizable monomers" include styrene, vinyltoluene, (meth)acrylamide-based monomers, (meth)acrylonitrile-based monomers, vinyl alkanoate-based monomers, and the like.

The acid value of the A-B block copolymer is within the specific numerical range. As at least one monomer that makes up the A-B block copolymer, it is preferred to use a (meth) acrylic acid-based compound having one or more acid groups. Examples of such one or more acid groups include carboxyl groups, sulfonic groups, phosphoric groups, and the like. Among these, the use of one or more carboxyl-containing, (meth)acrylic acid-based compounds is preferred for water resistance and availability. Examples of the carboxyl-containing, (meth)acrylic acid-based compounds include (meth) acrylic acid, acrylic acid dimer, itaconic acid, maleic acid, phthalic acid, crotonic acid, monomers obtained by half-esterifying dibasic acids, such as phthalic acid and maleic acid, with hydroxyl-containing monomers such as 2-hydroxyethyl (meth) acrylate, and the like. Of these, (meth) acrylic acid is particularly preferred from the viewpoint of polymerizability.

A description will next be made about each of the polymer block A and polymer block B that make up the A-B block copolymer. It is to be noted that the A-B block copolymer is a block copolymer formed of two blocks linked together and that for the sake of convenience, one of the polymer blocks is called "the polymer block A" and the other polymer block is called "the polymer block B".

Polymer Block A

The polymer block A is a polymer block obtained by suitably selecting and polymerizing one or more of the above-mentioned various monomers. The acid value of the polymer block A is 0 to 30 mgKOH/g, with 0 to 20 mgKOH/g being preferred. As the acid value is within the above-described range, the polymer block A is substantially insoluble in water. The polymer block A is, therefore, considered to become a segment that forms particles, when the A-B block copolymer with the polymer block A contained therein is dispersed and emulsified in an aqueous medium. It is to be noted that the adhesiveness to a base material and the particle sizes of emulsion particles can be controlled by including a small amount of acid groups in the polymer block A within the above-described acid value range.

The glass transition point (which may hereinafter be also referred to as "Tg") of the polymer block A is not higher than 60° C., with 5 to 50° C. being preferred. Because the Tg is within the above-described range, the resulting emulsion binder is provided with improved film-forming properties. Although the more preferred Tg is room temperature (25° C.) or lower, the resulting emulsion binder can be provided with enhanced film-forming properties, for example, by adding a film-forming aid to the resulting ink insofar as the Tg is not higher than 60° C.

The Tg of the polymer block A may be measured by thermal analysis or may be determined in a simplified manner subsequent to the polymerization of the polymer block A. In the case of a polymer (copolymer) obtained by copolymerizing monomers as many as x kinds of monomer components, for example, the Tg (T(° C.)) of the copolymer can be calculated from the following equation (1) when the masses (g) of the respective monomers are assumed to be "$W_1, W_2, \ldots W_x$" and the glass transition points (Tg) (° C.) of homopolymers of the respective monomers are assumed to be "$T_1, T_2, \ldots T_x$":

$$1/T = W_1/(T_1+273) + W_2/(T_2+273) + \ldots + W_x/(T_x+273) \quad (1)$$

As the values of the glass transition points (Tg) of the homopolymers, the values described in "POLYMER HANDBOOK 4$^{th}$ Edition" may be used, or as an alternative the values in various literature may be used. It is to be noted that the values described in "POLYMER HANDBOOK 4$^{th}$ Edition" are used in the present invention.

Owing to the existence of the polymer block A, the A-B block copolymer can be particulated and can be rendered substantially insoluble in water. The emulsion binder with the A-B block copolymer contained therein is, therefore, provided with a low viscosity. When this emulsion binder is added to an ink, the ink is hence provided with good ejection stability without any substantial increase in its viscosity. As the A-B block copolymer is substantially insoluble in water, the use of the ink, which makes use of the emulsion binder containing the A-B block copolymer, makes it possible to form printed ink films that show high adhesiveness to a base material.

Polymer Block B

The acid value of the polymer block B is 75 to 250 mgKOH/g, with 100 to 200 mgKOH/g being preferred. As the acid value is within the above-described range, the polymer block B is substantially soluble in water. If the acid value of the polymer block B is smaller than 75 mgKOH/g, the polymer block B is provided with lower resolubility. If the acid value of the polymer block B is greater than 250 mgKOH/g, on the other hand, the resulting printed ink films may be provided with lower water resistance. It is to be noted that the polymer block B can be converted into a water-soluble polymer block by neutralizing the acid groups in the polymer block B with an alkaline material such as ammonia, an amine or sodium hydroxide. When the polymer block A is particulated, the polymer block B is dissolved in water. As a consequence, the A-B block copolymer is controlled in particle size, and particles of the A-B block copolymer are allowed to exist (can be dispersed) stably in an aqueous medium. Further, the water-based inkjet pigment ink prepared by using the A-B block copolymer shows excellent resolubility owing to the high water solubility of the polymer block B even when it dries up in a head.

The acid groups in the polymer block B have been neutralized in the ink. The polymer block B can, therefore, be considered to be a block that shows solubility in water. Accordingly, the ink making use of the emulsion binder, which contains the A-B block copolymer having the polymer block B, can be readily dissolved with a washing solution such as water even when it dries up on an ejection nozzle (head) or the like, and shows excellent redispersibility.

A-B Block Copolymer

The number average molecular weight (which may hereinafter be also referred to as "Mn") of the A-B block copolymer is 5,000 to 100,000, with 8,000 to 50,000 being preferred. It is to be noted that Mn means a polystyrene equivalent value as measured by a gel permeation chromatograph (which may hereinafter be also referred to as "GPC") unless otherwise indicated. The Mn of the A-B block copolymer is the total of the Mn of the polymer block A and the Mn of the polymer block B. Therefore, no particular limitation is imposed on the number average molecular weights Mn of the respective polymer blocks A and B insofar as the Mn of the A-B block copolymer falls within the above-described numerical range.

If the Mn of the A-B block copolymer is lower than 5,000, the molecular weight is so low that the printed ink films formed with the water-based inkjet pigment ink can be hardly provided with improved physical properties such as adhesiveness. If the Mn of the A-B block copolymer is excessively high, on the other hand, the water-based inkjet pigment ink is not provided with resolubility.

The polydispersity index (which may hereinafter be also referred as "PDI") of the A-B block copolymer as expressed by the value of the ratio (Mw/Mn) of its weight average molecular weight (which may hereinafter be also referred to as "Mw") to its number average molecular weight (Mn) is not greater than 1.7, with 1.6 or smaller being preferred.

The mass ratio (A/B) of the polymer block A to the polymer block B contained in the A-B block copolymer may preferably be 20/80 to 95/5, with 30/70 to 90/10 being more preferred. When the mass ratio of the polymer block A to the polymer block B falls within the above-described range, the water-insoluble segment (the polymer block A) and the water-soluble segment (the polymer block B), which make up the A-B block copolymer, are well-balanced.

The A-B block copolymer can be synthesized, for example, by polymerizing one of the polymer blocks and then adding the monomer component or components, which makes or make up the other polymer block, and conducting polymerization further. Here, when the PDI of the one polymer block polymerized first is large, the other polymer block polymerized subsequently is provided with a still greater PDI. If the PDI of the resulting A-B block copolymer is excessively large, the A-B block copolymer tends to be hardly emulsifiable and also to provide the resulting water-based inkjet pigment ink with insufficient resolubility. It is, therefore, possible to emulsify the A-B block copolymer well and to provide the water-based inkjet pigment ink with improved resolubility by controlling somewhat narrow the PDI of the one polymer block, which is to be polymerized first, and controlling the PDI of the A-B block copolymer, which is to be obtained finally, at 1.7 or smaller.

Emulsion Binder

In the emulsion binder according to the present invention, the A-B block copolymer has been neutralized with the alkaline material, and has been allowed to self-emulsify in the aqueous medium to form emulsion particles. The number average particle size of the emulsion particles so formed is 30 to 300 nm, with 50 to 200 nm being preferred. If the number average particle size of the emulsion particles is smaller than 30 nm, the emulsion particles are so small that the resulting ink may be provided with a high viscosity.

If the number average particle size of the emulsion particles is greater than 300 nm, on the other hand, an inkjet head tends to become prone to clogging so that ejection may become difficult.

The acid groups in the A-B block copolymer are neutralized, for example, by adding the alkaline material to the A-B block copolymer as it is after the polymerization or after it is once taken out subsequent to the polymerization. As the polymer block A is a substantially water-insoluble block, it contributes to the particulation of the A-B block copolymer. On the other hand, the polymer block B is a substantially water-soluble block, and allows the A-B block copolymer to self-emulsify so that stable emulsion particles are formed. It is to be noted that the number average particle size of emulsion particles can be measured by a conventionally-known method. The number average particle size in the present invention can be measured by a light-scattering particle size analyzer (for example, "N4PLUS", trade name, manufactured by Beckman Coulter GmbH).

No particular limitation is imposed on the alkaline material to be used for neutralizing the acid groups in the A-B block copolymer. Illustrative are ammonia; organic amines such as triethylamine, dimethylaminoethanol, and triethanolamine; and alkali metal hydroxides such as sodium hydroxide and potassium hydroxide.

The above-described aqueous medium can be water alone, or can be a mixed solvent of water and a water-soluble organic solvent. Specific examples of the water-soluble organic solvent include water-soluble lower fatty alcohols such as ethanol and isopropanol; water-soluble ketone solvents such as acetone; water-soluble ester solvents such as ethyl lactate; water-soluble ether solvents such as tetrahydrofuran, ethylene glycol dimethyl ether and diethylene glycol dimethyl ether; water-soluble glycol solvents such as propylene glycol, ethylene glycol, and monoalkyl ethers thereof; water-soluble amide solvents such as N-methylpyrrolidone; water-soluble polyol solvents such as glycerin and 1,2-hexanediol; and the like. These water-soluble organic solvents can be used either singly or as a combination of two or more thereof. When two or more water-soluble organic solvents are used in combination, they can be used in proportions as desired.

The emulsion binder according to the present invention may preferably be prepared, after the polymerization of the A-B block copolymer in a water-soluble organic solvent, by (i) adding an aqueous solution of the alkaline material to neutralize the acid groups in the A-B block copolymer for its self-emulsification or (ii) adding the alkaline material to neutralize the acid groups in the A-B block copolymer and then adding water further to allow it to self-emulsify. By preparing the emulsion binder as described above, microparticulation can be achieved without precipitation or thickening.

2. Water-based Inkjet Pigment Ink

A description will next be made about details of the water-based inkjet pigment ink according to the present invention. In the water-based inkjet pigment ink according to the present invention, a pigment and a film-forming binder are contained. This film-forming binder is the above-mentioned emulsion binder. The use of the above-mentioned emulsion binder as a film-forming binder can provide a water-based, pigment-dispersed inkjet ink, which has high-speed printability and excellent ejection stability, can form printed ink films excellent in water resistance and the adhesiveness to a base material, and can be redissolved and readily removed even when it dries up in an ejection nozzle (head) or the like. The proportion of the emulsion binder contained in the water-based inkjet pigment ink according to the present invention may be preferably 5 to 20 mass %, more preferably 7.5 to 15 mass % in terms of solids concentration based on the total amount (100 mass %) of the ink.

Pigment

As the pigment, organic pigments and inorganic pigments, which have been used conventionally, can be used either singly or as a combination of two or more thereof. Specific examples of the pigment include carbon black pigment, quinacridone pigments, phthalocyanine pigments, benzimidazolone pigments, isoindolinone pigments, azo pigments, titanium oxide pigments, and the like.

Among these, preferred is at least one pigment selected from the group consisting of Color Index Numbers (C.I.) Pigment Blue 15:3 and 15:4; C.I. Pigment Red 122 and 269; C.I. Pigment Violet 19; C.I. Pigment Yellow 74, 155, 180 and 183; C.I. Pigment Green 7, 36 and 58; C.I. Pigment Orange 43; C.I. Pigment Black 7; and C.I. Pigment White 6, all of which are used in inkjet inks.

The number average primary particle size of the pigment may be preferably smaller than 350 nm, with 150 nm or smaller being preferred in the case of organic pigments. Especially when C.I. Pigment Blue 15:3 or 15:4; C.I. Pigment Red 122 or 269; C.I. Pigment Violet 19; C.I. Pigment Yellow 74, 155, 180 or 183; C.I. Pigment Green 7, 36 or 58; C.I. Pigment Orange 43; or C.I. Pigment Black 7 is used as the pigment, the number average primary particle size of such a pigment may preferably be 150 nm or smaller.

When C.I. Pigment White 6 is used as a pigment, its number average primary particle size may preferably be 300 nm or smaller. A smaller number average primary particle size is preferred especially when the clogging of a head and the sharpness of an image to be formed are taken into consideration.

The pigment can be a self-dispersible pigment with functional groups introduced on a surface thereof, or can be a pigment treated at surfaces thereof or encapsulated with a surface treatment agent, such as a coupling agent or activator, a resin, or the like. The proportion of the pigment contained in the water-based inkjet pigment ink may be preferably 2 to 15 mass %, more preferably 4 to 10 mass % based on the total amount (100 mass %) of the ink.

Pigment Dispersant

It is preferred to include a pigment dispersant in the water-based inkjet pigment ink. Especially when an ordinary pigment (inorganic pigment, organic pigment) having no self-dispersibility is used as a pigment without using any self-dispersible pigment, the inclusion of a pigment dispersant is preferred because it can disperse such a pigment in a suitable state. As a pigment dispersant, a conventionally-known pigment dispersant can be used, and no particular limitation is imposed thereon. Specific examples of the pigment dispersant include random polymerization products such as acrylic polymers and styrene-based polymers, block copolymer-type dispersants, graft polymer-type dispersants, star-shaped polymer-type dispersants, hyperbranched dispersants, and the like. The proportion of the pigment dispersant contained in the water-based inkjet pigment ink may be preferably 0.5 to 15 mass %, more preferably 2 to 10 mass % based on the total amount (100 mass %) of the ink.

Other Components

In the water-based inkjet pigment ink according to the present invention, one or more of components other than the pigment and pigment dispersant (hereinafter referred to as "other components") may be contained additionally. As such "other components", media, various additives and the like can be exemplified.

As the media, water and the above-mentioned water-soluble organic solvents can be mentioned. Specific examples of the water-soluble organic solvents include diethylene glycol monobutyl ether, triethylene glycol monobutyl ether, glycerin, propylene glycol, 1,2-hexanediol, 2-pyrrolidone, N-methyl-2-pyrrolidone, and the like. The use of these water-soluble organic solvents can prevent the drying of a head more effectively. It is preferred to use one or more of these water-soluble organic solvents, and it is also preferred to use one or more of these water-soluble organic solvents in combination with water. The proportion of the water-soluble organic solvent contained in the water-based inkjet pigment ink may be preferably 1 to 40 mass %, more preferably 5 to 20 mass % based on the total amount (100 mass %) of the ink.

Specific examples of the various additives include surfactants, pigment derivatives, dyes, leveling agents, defoaming agents, ultraviolet absorbers, and the like. No particular limitations are imposed on the contents of these additives insofar as they fall within ranges that do not impair the advantageous effects of the present invention.

3. Process for Producing Emulsion Binder

A description will next be made about the process for producing the emulsion binder. The process according to the present invention for producing the emulsion binder includes a step of subjecting at least one (meth)acrylate-based monomer to living radical polymerization by using at least an iodine compound as a polymerization initiator compound, thereby synthesizing an A-B block copolymer. A description will hereinafter be made about details of the synthesis step.

Synthesis Step of A-B Block Copolymer

The A-B block copolymer can be also synthesized by a conventional living radical polymerization process. In the present invention, however, the A-B block copolymer is synthesized by subjecting the above-mentioned at least one (meth)acrylate-based monomer to living radical polymerization. Upon conducting living radical polymerization, the iodine compound is used as a polymerization initiator compound. When the iodine compound is used as a polymerization initiator compound, iodine radicals generated by heat or light react with the monomer to form polymer-end radicals. Successively-generated iodine radicals link to polymer-end radicals and become stable, thereby making it possible to prevent the occurrence of a termination reaction. As the living radical polymerization proceeds through a repetition of the above-mentioned reaction and linking, the resulting A-B block copolymer can be easily controlled in molecular weight and structure.

No particular limitation is imposed on the iodine compound insofar as it can generate iodine radicals under the action of heat or light. Specific examples of the iodine compound include alkyl iodides such as 2-iodo-1-phenylethane and 1-iodo-1-phenylethane; cyano-containing iodides such as 2-cyano-2-iodopropane, 2-cyano-2-iodobutane, 1-cyano-1-iodocyclohexane, 2-cyano-2-iodovaleronitrile; and the like.

A commercial iodine compound may be used as it is, or an iodine compound synthesized by a conventionally-known process may be used. An iodine compound can be obtained, for example, by reacting an azo compound such as azobisisobutyronitrile with iodine. As an alternative, an iodine compound may also be produced by using an iodide salt such as quaternary ammonium iodide or sodium iodide along with an organic halide having one or more halogen atoms other than iodine atoms, such as bromine or chlorine atoms, and inducing a halogen exchange reaction in a reaction system.

In the living radical polymerization, it is preferred to use a catalyst that can extract iodine atoms from an iodine compound to generate iodine radicals. Illustrative of such a catalyst include phosphorus-containing compounds such as phosphorus halides, phosphite compounds and phosphinate compounds; nitrogen-containing compounds such as imide compounds; oxygen-containing compounds such as phenolic compounds; and hydrocarbon compounds containing one or more active carbon atoms, such as diphenylmethane compounds and cyclopentadiene compounds. These catalysts may be used either singly or as a combination of two or more thereof.

Specific examples of the phosphorus-containing compounds include phosphorus triiodide, diethyl phosphite, dibutyl phosphite, ethoxyphenylphosphinate, phenylphenoxyphosphinate, and the like. Specific examples of the nitrogen-containing compounds include succinimide, 2,2-dimethylsuccinimide, maleimide, phthalimide, N-iodosuccinimide, hydantoin, and the like. Specific examples of the oxygen-containing compounds include phenol, hydroquinone, methoxyhydroquinone, t-butylphenol, catechol, di-t-butylhydroxytoluene, and the like. Specific examples of the hydrocarbon compounds include cyclohexadiene, diphenylmethane, and the like. The amount (molar number) of the catalyst to be used is less than the amount (molar number) of the below-described polymerization initiator to be used. If the catalyst is used in an excessively large amount, the polymerization may hardly proceed.

Upon conducting the living radical polymerization, the temperature may preferably be controlled at 30 to 50° C. Especially when methacrylic acid is used as an acid group-containing (meth) acrylic acid compound, the temperature may preferably be controlled within the above-described range upon conducting the living radical polymerization. If the temperature is excessively high, polymer-end iodine radicals are prone to decomposition by methacrylic acid, so that the formed polymer ends do not become stable and the living radical polymerization may hardly proceed.

Upon conducting the living radical polymerization, it is preferred to add a polymerization initiator to facilitate the generation of iodine radicals. As the polymerization initiator, a conventionally-known compound such as an azo-type initiator or peroxide-type initiator can be used. However, a compound that can sufficiently generate iodine radicals at the above-described polymerization temperature is preferred as the polymerization initiator. Described specifically, azo-type initiators such as 2,2'-azobis(4-methoxy-2,4-dimethylvaleronitrile) can be mentioned. The amount of the polymerization initiator to be used may be set preferably at 0.001 to 0.1 molar times, more preferably at 0.002 to 0.05 molar times the one or more monomers to be polymerized. If the polymerization initiator is used in an excessively small amount, the living radical polymerization may not proceed sufficiently. If the polymerization initiator is used in an excessively large amount, on the other hand, usual radical polymerization which is not living radical polymerization may proceed as a side reaction.

The living radical polymerization may be conducted as bulk polymerization without using any organic solvent, but solution polymerization that uses a solvent is preferred. The solvent may preferably be one capable of dissolving the iodine compound, catalyst, monomer or monomers, and polymerization initiator. In particular, a water-soluble organic solvent is preferred when the dispersion of the pigment is taken into consideration.

Upon conducting solution polymerization, the solids concentration (monomer concentration) of the polymerization mixture is not particularly limited, but my be preferably 5 to 80 mass %, more preferably 20 to 60 mass %. If the solids concentration is lower than 5 mass %, the monomer concentration is so low that the polymerization may not be brought to completion. If the solids concentration is higher than 80 mass %, on the other hand, the polymerization is conducted practically as bulk polymerization so that the viscosity of the polymerization mixture becomes excessively high. Therefore, stirring can be hardly conducted, and the polymerization yield tends to become lower.

The living radical polymerization may be conducted preferably until the monomer or monomers are used up. Described specifically, the polymerization time may be set preferably for 0.5 to 48 hours, with the setting practically for 1 to 24 hours being more preferred. The polymerization atmosphere is not particularly limited, and can be an atmosphere in which oxygen exists within an ordinary range or can be a nitrogen gas stream atmosphere. As the materials (monomer or monomers, etc.) for use in the polymerization, those from which impurities have been removed by distillation, treatment with activated carbon, or treatment with alumina may be used, or commercial products maybe used as they are. The polymerization may be conducted under shading or in a clear vessel of glass or the like.

A description will next be made about polymerization sequences. As polymerization sequences for the A-B block copolymer, it is preferred (i) to polymerize one or more hydrophilic monomers to form the polymer block A, and then (ii) to add and further polymerize one or more monomers that will make up the polymer block B. If the monomer or monomers that will make up the polymer block B is or are polymerized first, the polymerization may not be brought to completion so that one or more monomers having an acid group or acid groups, such as methacrylic acid, may remain in the reaction system. In such a case, the introduction of the one or more monomers, which have an acid group or acid groups, into the polymer block A is facilitated, so that the resulting polymer block A may be impaired in hydrophilicity (its acid value may exceed the predetermined range). When the monomer or monomers that will make up the polymer block A is or are polymerized first, on the other hand, the A-B block copolymer can be readily obtained, even if the polymerization is not brought to completion and the one or more monomers remain in the reaction system, provided that the polymer block B is introduced such that at least 90 mass % of the constituent monomer units of the resultant A-B block copolymer are derived from one or more (meth)acrylate monomers.

By adjusting the amount of the polymerization initiator compound (iodine compound) to be used, the molecular weight of the resulting A-B block copolymer can be controlled. Described specifically, the A-B block copolymer can be obtained with a desired molecular weight by appropriately setting the molar number or numbers of one or more monomers relative to the molar number of the polymerization initiator compound. When polymerization is conducted, for example, by using 1 mole of a polymerization initiator compound and 500 moles of a monomer the molecular weight of which is 100, an A-B block copolymer can be obtained with a theoretical molecular weight of "1×100×500=50, 000". Therefore, the theoretical molecular weight of the A-B block copolymer can be calculated by the below-described equation (2). It is to be noted that the above-described term "molecular weight" has a concept which includes both a number average molecular weight (Mn) and a weight average molecular weight (Mw).

"Theoretical molecular weight of A-B block copolymer"="polymerization initiator compound (1 mole)"×"molecular weight of monomer"× "molar number of monomer/molar number of polymerization initiator compound" (2)

As the above-mentioned living radical polymerization may be accompanied by a side reaction such as bimolecular termination or disproportionation, the A-B block copolymer may not be obtained with the above-described theoretical molecular weight. The A-B block copolymer is preferably one obtained without the occurrence of such a side reaction. However, the A-B block copolymer may be obtained with a little higher molecular weight through coupling, or may be obtained with a little lower molecular weight as a result of termination of the polymerization reaction in the middle. The rate of polymerization is not required to be 100%. By adding a polymerization initiator or catalyst after the polymerization is once finished, the remaining monomer or monomers may be consumed to bring the polymerization to completion. Therefore, no other conditions are imposed on the living radical polymerization insofar as the A-B block copolymer is produced.

Although the thus-obtained A-B block copolymer may be in a form that iodine atoms derived from the iodine compound used as a polymerization initiator compound are still bound, it is preferred to eliminate the iodine atoms. As a method for eliminating the iodine atoms from the A-B block copolymer, no particular limitation is imposed insofar as it is a conventionally-known method. Described specifically, the A-B block copolymer may be heated, or may be treated with an acid or alkali. Or, the A-B block copolymer may be treated with sodium thiosulfate or the like. The eliminated iodine may be treated and removed with an iodine adsorbent such as activated carbon or alumina.

By neutralizing the thus-obtained A-B block copolymer with an alkaline material and allowing it to self-emulsify in an aqueous medium, an emulsion binder containing emulsion particles, the number average particle size of which is 30 to 300 nm, can be obtained. In the present invention, it is preferred (i) to conduct the above-described living radial polymerization in a water-soluble organic solvent, (ii) then to add the alkaline material to the reaction system to achieve neutralization, and (iii) subsequently to mix the neutralized polymerization mixture with water such that the A-B block copolymer is allowed to self-emulsify. In this manner, the resulting emulsion particles can be easily controlled in number average particle size.

4. Method for Producing Water-based Inkjet Pigment Ink

A description will next be made about a method for producing a water-based inkjet pigment ink. The water-based inkjet pigment ink can be produced, for example, by (i) dispersing a pigment in an aqueous medium to obtain a pigment dispersion, (ii) mixing the thus-obtained pigment dispersion with the emulsion binder, and (iii) adding one or more additives as needed.

A pigment dispersion can be prepared by a conventionally-known method. A pigment dispersion can be obtained, for example, by mixing a pigment, pigment dispersant and aqueous medium, and adding one or more additives such as an activator as needed. When an organic pigment is used as a pigment, the proportion of the organic pigment contained in the pigment dispersion maybe set preferably at 10 to 30 mass % based on the total amount of the ink. When an inorganic pigment is used as the pigment, on the other hand, the proportion of the inorganic pigment contained in the pigment dispersion maybe set preferably at 40 to 70 mass % based on the total amount of the ink.

The proportion of the pigment dispersant contained in the pigment dispersion may be set preferably at 5 to 30 parts by mass per 100 parts by mass of the pigment. When a self-dispersible pigment is used as the pigment, it is unnecessary to use the pigment dispersant. For mixing the individual components to disperse the pigment, it is possible to use, for example, a kneading machine such as a kneader, two-roll mill, three-roll mill, or "MIRACLE KCK" (trade name, manufactured by Asada Iron Works Co., Ltd.); an ultrasonic disperser; or a high-pressure homogenizer such as "MICROFLUIDIZER" (trade name, manufactured by Mizuho Industrial Co., Ltd.), "NANOMIZER" (trade name, manufactured by Yoshida Kikai Co., Ltd.), "STAR BURST" (trade name, manufactured by Sugino Machine Limited), or "G-SMUSHER" (trade name, manufactured by Rix Corporation Co., Ltd.). It is also possible to use one making use of bead media, such as a ball mill, sand mill, medium-containing horizontal disperser, or colloid mill.

When an organic pigment is used, the number average primary particle size of the organic pigment in the pigment dispersion may be preferably 150 nm or smaller when the color developing properties of the ink, print quality, the settling of the pigment in the ink, and the like are taken into consideration. When an inorganic pigment is used, on the other hand, the number average primary particle size of the inorganic pigment in the pigment dispersion may be preferably 300 nm or smaller. For obtaining a pigment dispersion with a pigment dispersed with a desired particle size distribution, it is possible to use a method, for example, such as (i) to make smaller the size of a grinding medium in a disperser, (ii) to increase the fill rate of a grinding medium, (iii) to make longer the processing time, (iv) to reduce the discharge rate, or (v) to classify by a filter or centrifugal separator after grinding. Further, one or more of these methods may be combined. It is also possible to use a pigment which has been made finer beforehand by a conventionally-known method such as salt milling. After mixing and dispersion of the individual components, coarse particles may preferably be removed by a centrifugal separator or filter.

The water-based inkjet pigment ink according to the present invention can be obtained by mixing the thus-obtained pigment dispersion, an aqueous medium and the emulsion binder as a film-forming binder, and one or more additives, which may be used as needed, by a method known per se in the art.

From the standpoint of broadening the diameter of each dot, which is to be printed by an inkjet printer, to an optimal width, the surface tension of the water-based inkjet pigment ink may preferably be 20 to 40 mN/m. For controlling the surface tension of the water-based inkjet pigment ink within the above-described numerical value range, it is preferred to add a surfactant to the water-based inkjet pigment ink. As the surfactant, one known to date can be used. If the surfactant is added in an excessively large amount, the dispersion stability of the pigment may be impaired. The proportion of the surfactant contained in the water-based inkjet pigment ink may, therefore, be set preferably at 0.01 to 5 mass %, more preferably at 0.1 to 2 mass %.

The viscosity of the water-based inkjet pigment ink according to the present invention is not particularly limited, but may preferably be 2 to 10 mPa·s when an organic pigment is used. When an inorganic pigment is used, on the other hand, its viscosity may preferably be 5 to 30 mPa·s.

EXAMPLES

The present invention will next be described more Specifically based on examples and comparative examples. It should, however, be borne in mind that the present invention is by no means limited by these examples. Designations of "parts" and "%" in the following description are all on a mass basis.

(1) Preparation of Emulsion Binder

Example 1

Preparation of Emulsion Binder (1)

In a 1-L separable flask fitted with a stirrer, reflux condenser, thermometer and nitrogen inlet tube, diethylene glycol dimethyl ether (hereinafter referred to as "DMDG") (131.7 parts), iodine (1.0 parts), 2,2'-azobis(4-methoxy-2,4-dimethylvaleronitrile) (hereinafter referred to as "V-70") (4.9 parts), benzyl methacrylate (hereinafter referred to as "BzMA") (44 parts), 2-hydroxyethyl methacrylate (hereinafter referred to as "HEMA") (13 parts), and N-iodosuccinimide (0.11 parts) were charged. Under stirring, the contents were heated to 40° C., at which polymerization was conducted. Three hours later, the brown color of iodine had disappeared. From this, it was able to confirm that iodine and V-70 reacted and an iodine compound (polymerization initiator compound) was produced in the reaction system. After the polymerization was conducted for further 4 hours with the temperature being maintained constant, the polymerization mixture was allowed to cool naturally so that a solution of a polymer block A was obtained.

A portion of the solution was sampled and measured for solids concentration. The solids concentration was found to be 27.50. The rate of polymerization as measured from the measured solids concentration was approx. 85%. Further, the polymer block A was analyzed by GPC. Its Mn and PDI were found to be 7,500 and 1.31, respectively. The composition of the polymer block A so obtained was BzMA/HEMA≈77/23. The Tg as determined by theoretical calculation was 54.2° C., and the acid value was 0 mgKOH/g. When a sampled portion of the solution was added to water, a resin precipitated. As a consequence, the resultant polymer block A was confirmed to be a substantially water-insoluble polymer.

To the thus-obtained solution of the polymer block A, a mixture of methyl methacrylate (hereinafter referred to as "MMA") (52.8 parts), methacrylic acid (hereinafter referred to as "MAA") (12.9 parts) and V-70 (0.45 parts) was added. Polymerization was conducted for 4.5 hours to form a polymer block B, whereby a solution of an A-B block copolymer was obtained. The rate of polymerization was approx. 100%. In the structure of the polymer block B, constituent monomer units derived from BzMA and HEMA as residual monomers were contained. The composition of the polymer block B as converted from a yield was MMA/MAA/residual monomers≈71/17/12. The acid value of the polymer block B as calculated from the content of MAA was 110 mgKOH/g.

The Mn and PDI of the resultant A-B block copolymer were 14,000 and 1.45, respectively. To a sample obtained by dissolving a sampled portion (0.5 parts) of the A-B block copolymer in a 3/2 (volume ratio) mixture of toluene and ethanol, phenolphthalein was added as an indicator, followed by titration to neutral with a 0.1 N solution of KOH in ethanol. As a result, the acid value of the A-B block copolymer was 69.0 mgKOH/g. The mass ratio (A/B) of the polymer block A to the polymer block B as calculated from the results of the polymerization yield was 39.5/60.5.

The solution of the A-B block copolymer was vigorously agitated. Upon addition of a mixed solution of 28% aqueous ammonia (10 parts) and water (10 parts), a semi-clear liquid having viscosity was obtained. When water (243.4 parts) was gradually added, the liquid turned slightly yellowish, whereby a low-viscosity emulsion having clearness (emulsion binder (1)) was obtained. The viscosity of the low-viscosity emulsion as measured by a Brookfield rotational viscometer was 85.5 mPa·s, and the solids concentration was 24.6%. Further, the number average particle size of emulsion particles as measured by a light-scattering particle size distribution analyzer was 86 nm.

Example 2

Preparation of Emulsion Binder (2)

A solution of a polymer block A was obtained as in Example 1 described above except for the use of DMDG (362.3 parts), iodine (1.0 parts), V-70 (4.9 parts), MMA(105 parts),2-ethylhexylmethacrylate (hereinafter referred to as "2EHMA") (148.5 parts), HEMA (45.5 parts) and diphenylmethane (0.17 parts). The rate of polymerization was 80.5%. The Mn and PDI of the resultant polymer block A were 22,000 and 1.56, respectively, and the polymer composition was MMA/2EHMA/HEMA≈35/50/15. The Tg as determined by theoretical calculation was 31.5° C., and the acid value was 0 mgKOH/g. When a sampled portion of the solution was added to water, a soft polymer precipitated. As a consequence, the resultant polymer block A was confirmed to be a substantially water-insoluble polymer.

Polymerization was conducted for 6 hours as in Example 1 described above except for the addition of a mixture of MMA (40 parts), MAA (17.2 parts) and V-70 (0.6 parts) to the thus-obtained solution of the polymer block A, whereby a polymer block B was formed to obtain a solution of an A-B block copolymer. The rate of polymerization was approx. 100%. The composition of the polymer block B as converted from a yield was MMA/MAA/residual monomers≈35/15/50. The acid value of the polymer block B as calculated from the content of MAA was 97.8 mgKOH/g.

The Mn, PDI and acid value of the resultant A-B block copolymer were 28,000, 1.67 and 31.0 mgKOH/g, respectively. The mass ratio (A/B) of the polymer block A to the polymer block B as calculated from the results of the polymerization yield was 67.5/32.5. The solution of the A-B block copolymer was vigorously agitated. Upon addition of a mixed solution of dimethylaminoethanol (17.8 parts) and water (17.8 parts), a bluish, cloudy high-viscosity liquid was obtained. When water (885.7 parts) was added, a bluish, low-viscosity, white emulsion (emulsion binder (2)) was obtained. The viscosity of the white emulsion as measured by a Brookfield rotational viscometer was 44.9 mPa·s, and the solids concentration was 26.3%. Further, the number average particle size of emulsion particles was 153 nm.

Example 3

Preparation of Emulsion Binder (3)

A solution of a polymer block A was obtained as in Example 1 described above except that polymerization was conducted for 6 hours by using DMDG (197.1 parts), iodine (0.4 parts), V-70 (2.4 parts), MMA (54 parts), butyl methacrylate (hereinafter referred to as "BMA") (49 parts), dodecyl methacrylate (hereinafter referred to as "LMA") (50 parts), MAA (3 parts) and di-t-butylhydroxytoluene (hereinafter referred to as "BHT") (0.1 parts). The rate of polymerization was approx. 100%. The Mn and PDI of the resultant polymer block A were 30,000 and 1.61, respectively, and the polymer composition was MMA/BMA/LMA/MAA≈35/31/32/2. The Tg as determined by theoretical calculation was 7.7° C., and the acid value was 12.6 mgKOH/g.

When a sampled portion of the solution was added to water, a soft polymer precipitated. The polymer block A had carboxyl groups, and therefore, had possibility of dissolution in alkaline water. The polymer block A was, accordingly, checked for solubility by adding a sampled portion (0.2 g) of the polymer block A to a 0.1 N aqueous solution (1 mL) of NaOH and stirring the resulting mixture for 24 hours with a magnetic stirrer. As a result, a white, rubbery resin precipitated. From the foregoing, the resultant polymer block A was confirmed to be insoluble in neural or alkaline water.

Polymerization was conducted for 6 hours as in Example 1 described above except for the addition of a mixed solution of MMA (24 parts), MAA (13.6 parts) and V-70 (0.6 parts) to the thus-obtained solution of the polymer block A, whereby a polymer block B was formed to obtain a solution of an A-B block copolymer. The rate of polymerization was approx. 100%. The composition of the polymer block B as converted from a yield was MMA/MAA64/36. The acid value of the polymer block B as calculated from the content of MAA was 235 mgKOH/g.

The Mn, PDI and acid value of the resultant A-B block copolymer were 35,000, 1.62 and 55 mgKOH/g, respectively. The mass ratio (A/B) of the polymer block A to the polymer block B as calculated from the results of the polymerization yield was 80.5/19.5. The solution of the A-B block copolymer was vigorously agitated. Upon addition of a mixed solution of 28% aqueous ammonia (12.9 parts) and water (12.9 parts), a bluish, cloudy high-viscosity liquid was obtained. When water (368.4 parts) was added, a bluish, low-viscosity, white emulsion (emulsion binder (3)) was obtained. The viscosity of the white emulsion as measured by a Brookfield rotational viscometer was 56.1 mPa·s, and the solids concentration was 24.9%. Further, the number average particle size of emulsion particles was 132 nm.

Comparative Example 1

Water-Soluble Polymer

In a 1-L separable flask fitted with a stirrer, reflux condenser, thermometer, nitrogen inlet tube and dropping funnel, DMDG (100 parts) was placed and heated to 40° C. In a separate vessel, BzMA (35.8 parts), HEMA (10.6 parts), MMA (43.1 parts), MAA (10.5 parts) and V-70) (3 parts) were placed, and were stirred to prepare a mixed monomer solution. A half volume of the mixed monomer solution so prepared was placed in a dropping funnel and was added dropwise. After the remaining half volume of the monomer solution was added dropwise over 1.5 hours, polymerization was conducted at 40° C. for 6 hours to obtain a polymer solution. The rate of polymerization was approx. 100%. The Mn, PDI and acid value of the resultant polymer were 12,500, 1.96 and 69.1 mgKOH/g, respectively.

The polymer solution was vigorously agitated. Upon addition of a mixed solution of 28% aqueous ammonia (8.2parts) and water (41.8parts),a clear viscous liquid was obtained. When water (150 parts) was added, a clear polymer solution (water-soluble polymer) was obtained. The viscosity of the polymer solution as measured by a Brookfield rotational viscometer was 251 mPa·s, and the solids concentration was 24.6%. The resultant water-soluble polymer was a random copolymer, and its composition was the same as that of the A-B block copolymer which was contained in the emulsion binder (1) obtained in Example 1.

Comparative Example 2

Emulsion Polymer (1)

A solution of a first-stage polymer block was obtained by conducting first-stage polymerization as in Example 2 described above except that neither iodine nor diphenylmethane was used. The rate of polymerization was 98%. The Mn and PDI of the resultant first-stage polymer block was 37,000 and 1.90, respectively. Using the thus-obtained first-stage polymer block, polymerization was conducted for 6 hours as in Example 2 described above, whereby a second-stage polymer block was formed to obtain a solution of a block polymer. The rate of polymerization was approx. 100%. The Mn and PDI of the resultant block polymer were 27,000 and 1.95, respectively.

The solution of the block polymer was vigorously agitated. Upon addition of a mixed solution of dimethylaminoethanol (17.8 parts) and water (17.8 parts), the solution turned cloudy, a white bulky insoluble precipitate was formed, and stirring became difficult. When water was added further, the mixture was not emulsified, but a non-flowable white paste (emulsion polymer (1)) containing lots of precipitates was obtained.

The following reasons may be conceivable for the emulsification failure. In each of Examples 1 to 3, it is considered that the water-insoluble polymer block A was particulated and was allowed to self-emulsify by the water-soluble polymer block B. As a consequence, the emulsion is considered to have been obtained in good condition. In Comparative Example 2, on the other hand, the first-stage polymer block is not considered to have been emulsified well by the second-stage polymer block because the first-stage polymer block and second-stage polymer block were different polymers of structures independent from each other. From the foregoing, it is evident that emulsification (emulsified stabilization) is feasible in good condition by forming an A-B block copolymer in a specific structure.

Comparative Example 3

Emulsion polymer (2)

In a 1-L separable flask fitted with a stirrer, reflux condenser, thermometer, nitrogen inlet tube and dropping funnel, water (450 parts) and "Phosphanol RD-720" (phosphate ester-based surfactant, product of Toho Chemical Industry Co., Ltd.) (2.5 parts) were placed and heated to 70° C. MMA (52 parts), BMA (47 parts), LMA (48 parts) and MAA (3 parts) were placed and mixed in a separate vessel to prepare a mixed monomer solution.

Potassium persulfate (4 parts) was added to the separable flask, and the mixed monomer solution so prepared was placed in the dropping funnel. After the mixed monomer solution was added as much as a quarter of its volume, the rest was added dropwise over 1.5 hours. Aging was conducted at 70° C. for further 4 hours to obtain a polymer solution. The resultant polymer solution was a bluish cloudy emulsion, and some precipitates were observed in the reaction system and on a stirring shaft.

Upon addition of 28% aqueous ammonia (2.5 parts) to the polymer solution so obtained, a somewhat clear, white emulsion (emulsion polymer (2)) was obtained. The viscosity of the white emulsion as measured by a Brookfield rotational viscometer was 23 mPa·s, and the solids concentration was 25.1%. The number average particle size of emulsion particles was 104 nm. The Mn and PDI of the polymer so obtained were 123,000 and 3.63, respectively. Further, the acid value of the resultant polymer was lower compared with that of the polymer block A obtained in Example 3.

Example 4

Preparation of Red Inkjet Ink (1)

A mill base was prepared by combining and stirring C.I. Pigment Red 122 (dimethylquinacridone pigment, product of Dainichiseika Color & Chemicals Mfg. Co., Ltd.) (200 parts) as a red pigment, an ammonia-neutralized aqueous solution (solids content: 20%, 200 parts) of a styrene-acrylic acid copolymer (Mn: 5,000, acid value: 215 mgKOH/g), butyl diglycol (80 parts) and water (320 parts) in a disper mixer. Using a medium-containing, horizontal disperser "DYNO-MILL 0.6-L ECM MODEL" (trade name, manufactured by Shinmaru Enterprises Corporation; diameter of zirconia-made beads: 0.5 mm), the mill base so prepared was subjected to dispersion treatment at a peripheral speed of 10 m/s for 2 hours, whereby a dispersion was obtained. After the thus-obtained dispersion was subjected to centrifugal separation treatment (7,500 revolutions, 20 minutes), the dispersion was filtered through a membrane filter (pore size: 10 μm). Deionized water was added to obtain a red pigment dispersion (1) having a pigment concentration of 14%. Using a particle size measuring instrument "NICOMP 380ZLS-S" (manufactured by International Business Corporation), the number average particle size of pigment particles contained in the resultant red pigment dispersion (1) was measured. As a result, the number average particle size was found to be 122 nm. Further, the viscosity of the red pigment dispersion (1) as measured by a Brookfield rotational viscometer was 3.59 mPa·s.

After the resultant red pigment dispersion (1) (40 parts), the emulsion binder (1) (24.4 parts) obtained in Example 1, BDG (1.8 parts), 1,2-hexanediol (5 parts), glycerin (10 parts), "SURFINOL 465" (trade name, product of Air Products Inc.) (1 parts), and water (17.6 parts) were combined and thoroughly stirred, the resulting mixture was filtered through a membrane filter (pore size: 10 μm) to obtain a red inkjet ink (1). The viscosity of the red inkjet ink (1) so obtained was 2.81 mPa·s.

Comparative Example 4

Preparation of Red Inkjet Ink (2)

A red inkjet ink (2) was obtained as in Example 4 described above except that the water-soluble polymer obtained in Comparative Example 1 was used in place of the emulsion binder (1). The viscosity of the red inkjet ink (2) so obtained was 5.69 mPa·s. Such a high viscosity is considered to be attributable to the use of the water-soluble polymer.

Examples 5 to 7

Preparation of Blue Inkjet Ink (1), Yellow Inkjet Ink (1), and Black Inkjet Ink (1)

A blue pigment dispersion (1), yellow pigment dispersion (1) and black pigment dispersion (1) were obtained as in Example 4 described above except for the use of C.I. Pigment Blue 15:3 (product of Dainichiseika Color & Chemicals Mfg. Co., Ltd., "CYANINE BLUE A220JC") as a blue pigment, C.I. Pigment Yellow 74 (product of Dainichiseika Color & Chemicals Mfg. Co., Ltd., "SEIKA FAST YELLOW 2016G") as a yellow pigment and C.I. Pigment Black 7 (product of Evonik Degussa GmbH, "S170") as a black pigment, in place of the red pigment (C.I. Pigment Red 122). The number average particle sizes of pigment particles contained in the respective pigment dispersions so obtained and the measurement results of the viscosities of the respective pigment dispersions are shown in Table 1.

TABLE 1

|  | Number average particle size of pigment particles (nm) | Viscosity (mPa·s) |
| --- | --- | --- |
| Red pigment dispersion (1) | 122 | 3.59 |
| Blue pigment dispersion (1) | 121 | 3.12 |
| Yellow pigment dispersion (1) | 119 | 2.72 |
| Black pigment dispersion (1) | 130 | 4.21 |

In addition, a blue inkjet ink (1), yellow inkjet ink (1) and black inkjet ink (1) were also obtained as in Example 4 described above except for the use of the thus-obtained pigment dispersions of the respective colors. The measurement results of the viscosities of the respective inks so obtained are shown in Table 2.

TABLE 2

|  |  | Viscosity (mPa·s) |
| --- | --- | --- |
| Example 4 | Red inkjet ink (1) | 2.81 |
| Example 5 | Blue inkjet ink (1) | 2.60 |
| Example 6 | Yellow inkjet ink (1) | 2.20 |
| Example 7 | Black inkjet ink (1) | 3.20 |
| Comp. Ex. 4 | Red inkjet ink (2) | 5.69 |

As shown in Table 2, the inkjet inks obtained in Examples 4 to 7 are evidently lower in viscosity compared with the inkjet ink obtained in Comparative Example 4.

Evaluation of Printability

By filling the inkjet inks, which had been obtained in Examples 4 to 7 and Comparative Example 4, in cartridges, respectively, and using an inkjet printer "EM930C" manufactured by Seiko Epson Corp., solid printing was performed on "XEROX PAPER 4024" in the high-speed printing draft mode. As a result, when the inkjet inks obtained in Examples 4 to 7 were used, no clogging occurred in the head, neither thin spots nor streaks appeared on prints, and good print quality was exhibited, even when 100 sheets were printed. When the inkjet ink obtained in Comparative Example 4 was used, on the other hand, streaks appeared at a printed part when seven sheets had been printed. Subsequently, streaks and thin spots increased gradually, and the printing became no longer feasible on the $23^{rd}$ sheet. The inkjet ink obtained in Comparative Example 4 was high in viscosity and contained lots of dissolved polymer because of the use of the water-soluble polymer. The ejection stability is, therefore, considered to have been lowered due to non-Newtonian viscosity. On the other hand, the inkjet inks obtained in Examples 4 to 7 were low in viscosity because of the particulation of their film-forming components (film-forming binders), and are considered to have been pronouncedly improved in ejection stability.

Subsequent to the completion of each solid printing, the printer was once stopped and was left over for 24 hours. After having been left over, solid printing was performed again. As a result, it was possible to perform printing without problem when the inkjet inks obtained in Examples 4 to 7 were used. When the inkjet ink obtained in Comparative Example 4 was used, on the other hand, no printing was feasible. In the A-B block copolymers contained in the inkjet inks obtained in Examples 4 to 7, the polymer blocks B were high in acid value and were readily soluble in water. It is, therefore, considered that, even if the inks dried up in the head, they were redissolved to permit printing. Using the emulsion binder (2) obtained in Example 2, an inkjet ink was prepared. The inkjet ink showed similar results as the inkjet inks obtained in Examples 4 to 7.

Example 8

Preparation of Red Inkjet Ink (3)

In a 1-L separable flask fitted with a stirrer, reflux condenser, thermometer and nitrogen inlet tube, DMDG (295.68 parts), iodine (3.03 parts), V-70 (14.8 parts), BHT (0.66 parts) and cyclohexyl methacrylate (hereinafter referred to as "CHMA") (176.4 parts) were charged. Under stirring and nitrogen gas stream, the contents were heated to 40° C., at which polymerization was conducted for 6.5 hours to obtain a solution of a first polymer. A portion of the solution was sampled, and its solids content was measured. As a result, the solids content was found to be 21.1%, and the yield (non-volatile) was 67%. Further, the first polymer was analyzed by GPC. As a result, its Mn and PDI were found to be 4,000 and 1.37, respectively.

To the thus-obtained solution of the first polymer, a mixture of MMA (75 parts), MAA (25.8 parts) and V-70 (0.45 parts) was added. Polymerization was conducted for 4.5 hours to form a second polymer, whereby a solution of an A-B block copolymer was obtained. The non-volatile content was 48.3%, so that most of the monomers were confirmed to be polymerized. In the structure of the second polymer, constituent monomer units derived from CHMA as a residual monomer were contained. The composition of the polymer block B as converted from the yield was MMA/MAA/CHMA=59/20/21. The Mn and PDI of the resultant block copolymer were 6,200 and 1.41, respectively, and its acid value was 61.3 mgKOH/g.

To the solution of the block copolymer, BDG (147.8 parts) was added. Further, a mixture of sodium hydroxide (18.5 parts) and water (129.3 parts) was added for neutralization, and as a result, a clear solution (block polymer-type pigment dispersant) was obtained. The clear solution was absolutely free of precipitates, and its solids concentration was 34.4%.

The above-described block copolymer-type pigment dispersant (143parts), BDG (80parts) and purified water (377 parts) were mixed to obtain a clear homogeneous solution free of precipitates or cloudiness. To the resulting solution, C.I. Pigment Red 122 (dimethylquinacridone pigment, product of Dainichiseika Color & Chemicals Mfg. Co., Ltd.) (200 parts) was added as a red pigment, followed by deflocculation in a disper mixer to prepare a mill base. Using a medium-containing, horizontal disperser "DYNO-MILL 0.6-L ECM MODEL" (trade name, manufactured by Shinmaru Enterprises Corporation; diameter of zirconia-made beads: 0.5 mm), the mill base so prepared was subjected to dispersion treatment at a peripheral speed of 10 m/s for 2 hours, whereby a dispersion was obtained. To the thus-obtained dispersion (800 parts), deionized water (3,200 parts) was added such that the pigment concentration was lowered to 14%. Under stirring, 5% acetic acid was added. The initial pH was 9.5, and as a result of the addition of 5% acetic acid, the pH was lowered to 4.5 to obtain a water-based pigment dispersion. After the resultant water-based pigment dispersion was filtered, the filter cake was thoroughly washed with deionized water, whereby a pigment paste coated with the pigment dispersant (solids concentration: 30.5%) was obtained.

To the above-described pigment paste (700 parts), a solution of BDG (9.4 parts) and sodium hydroxide (1.15 parts) in water (29.2 parts) was added. After the resulting mixture was stirred for deflocculation, dispersion treatment was performed using the above-mentioned medium-containing horizontal disperser. Using an ultrahigh-pressure homogenizer "MICROFLUIDIZER" (manufactured by Microfluidics Corporation), the deflocculated mixture was next circulated three times under 150 MPa to obtain a dispersion. After the thus-obtained dispersion was subjected to centrifugal separation treatment (7,500 revolutions, 20 minutes), the dispersion was filtered through a membrane filter (pore size: 10 μm). Deionized water was added to obtain a red pigment dispersion (2) having a pigment concentration of 14%. Using a particle size measuring instrument "NICOMP 380ZLS-S" (manufactured by International Business Corporation), the number average particle size of pigment particles contained in the resultant red pigment dispersion (2) was measured. As a result, the number average particle size was found to be 108 nm. Further, the viscosity of the red pigment dispersion (2) as measured by a Brookfield rotational viscometer was 2.22 mPa·s. When the red pigment dispersion (2) was stored at 70° C. for one week, no changes were found in the particle size and viscosity of the pigment, and its storage stability was good.

After the resultant red pigment dispersion (2) (40 parts), the emulsion binder (3) (24.4 parts) obtained in Example 3, BDG (1.8 parts), 1,2-hexanediol (5 parts), glycerin (10 parts), "SURFINOL 465" (trade name, product of Air Products Inc.) (1 parts), and water (35.6 parts) were combined and thoroughly stirred, the resulting mixture was filtered through a membrane filter (pore size: 10 μm) to obtain a red inkjet ink (3). The viscosity of the red inkjet ink (3) so obtained was 3.0 mPa·s. The number average particle size of pigment particles contained in the red inkjet ink (3) was 108 nm.

Examples 9 to 11

Preparation of Blue Inkjet Ink (2), Yellow Inkjet Ink (2), and Black Inkjet Ink (2)

A blue pigment dispersion (2), yellow pigment dispersion (2) and black pigment dispersion (2) were obtained as in Example 8 described above except for the use of C.I. Pigment Blue 15:3 (product of Dainichiseika Color & Chemicals Mfg. Co., Ltd., "CYANINE BLUE A220JC") as a blue pigment, C.I. Pigment Yellow 74 (product of Dainichiseika Color & Chemicals Mfg. Co., Ltd., "SEIKA FAST YELLOW 2016G") as a yellow pigment and C.I. Pigment Black 7 (product of Evonik Degussa GmbH, "S170") as a black pigment, in place of the red pigment (C.I. Pigment Red 122). The number average particle sizes of pigment particles contained in the respective pigment dispersions so obtained and the measurement results of the viscosities of the respective pigment dispersions are shown in Table 3.

TABLE 3

|  | Number average particle size of pigment particles (nm) | Viscosity (mPa·s) |
| --- | --- | --- |
| Red pigment dispersion (2) | 120 | 2.80 |
| Blue pigment dispersion (2) | 95 | 2.53 |
| Yellow pigment dispersion (2) | 130 | 2.81 |
| Black pigment dispersion (2) | 110 | 4.29 |

In addition, a blue inkjet ink (2), yellow inkjet ink (2) and black inkjet ink (2) were also obtained as in Example 8 described above except that the thus-obtained pigment dispersions of the respective colors were used and the amounts of glycerin and water were adjusted to control the viscosity at 3.5 mPa·s in all the inks. The number average particle sizes of pigment particles contained in the respective inks so obtained and the measurement results of the viscosities of the respective inks are shown in Table 4

Comparative Example 5

Preparation of Red Inkjet Ink (4)

A red inkjet ink (4) was obtained as in Example 8 described above except that the emulsion polymer (2) obtained in Comparative Example 3 was used in place of the emulsion binder (3). The number average particle size of pigment particle s contained in the ink so obtained and the measurement results of the viscosity of the ink are shown in Table 4.

TABLE 4

|  |  | Number average particle size of pigment particles (nm) | Viscosity (mPa·s) |
|---|---|---|---|
| Ex. 8 | Red inkjet ink (3) | 115 | 3.5 |
| Ex. 9 | Blue inkjet ink (2) | 91 | 3.5 |
| Ex. 10 | Yellow inkjet ink (2) | 124 | 3.5 |
| Ex. 11 | Black inkjet ink (2) | 104 | 3.5 |
| Comp. Ex. 5 | Red inkjet ink (4) | 108 | 3.5 |

When the block copolymer-type pigment dispersants were used, the pigment dispersions and the inkjet inks making use of the pigment dispersions were all low in viscosity. Further, the red inkjet ink (4) making use of the surfactant-containing emulsion polymer (2) was also low in viscosity. In each of these inks, its low viscosity is considered to be attributable to the addition of the particulated low-viscosity emulsion.

By a similar procedure as in the "Printability test" described above, high-speed printing (solid printing) was performed using the inkjet inks obtained in Examples 8 to 11 and Comparative Example 5. As a result, good print quality was shown whichever inkjet ink was used. By a similar procedure as in the "Printability test" described above, the printer was once stopped after the completion of the solid printing, and was left over for 24 hours. Subsequently, solid printing was performed again. As a result, it was possible to perform printing without problem when the inkjet inks obtained in Examples 8 to 11 were used. When the inkjet ink obtained in Comparative Example 5 was used, on the other hand, no printing was feasible presumably because, when the emulsion polymer (2) added upon preparation of the red inkjet ink (4) of Comparative Example 5 dries up in the head, it remains as a film and shows no resolubility. On the other hand, the emulsion binder (3) added upon preparation of the inkjet inks of Examples 8 to 11 contained the water-soluble A-B block copolymer including the polymer block B of the high acid value. The inkjet inks of Examples 8 to 11 are, therefore, considered to have been promptly dissolved upon resumption of printing even when they dried up in the head.

Using the inkjet inks obtained in Examples 8 to 11, printing was also performed on base materials (PET films and polyvinyl chloride sheets). After the printing, the base materials were placed and dried for 5 minutes in a drier controlled at 70° C. A test similar to the cellophane tape peeling test (JIS-K5600) was conducted, in which a cellophane tape was allied to the printed surface of each base material and was then peeled off at once. No printed ink was peeled off whichever inkjet ink was used. Further, the printed inks were not separated even when they were scratched with a nail. It is, therefore, evident that the printed inks all showed good film properties. It is, therefore, clear from the foregoing that the inkjet ink obtained using the emulsion binder according to the present invention can form a film which shows good adhesiveness to a base material. A water resistance test was also conducted, in which the printed base materials were immersed for 1 hour in a constant-temperature water bath controlled at 70° C. and were then observed as to whether or not blisters, whitening, cracks and/or the like had occurred. As a result, no substantial changes were observed after the test. Further, the printed inks were not peeled off even when the above-described cellophane tape peeling test was conducted.

Industrial Applicability

The use of the emulsion binder according to the present invention can provide a water-based inkjet pigment ink that can meet high-speed printing especially.

The invention claimed is:

1. An emulsion binder comprising an A-B block copolymer formed of a polymer block A and another polymer block B, at least 90 mass % of constituent monomer units of said A-B block copolymer having been derived from at least one (meth) acrylate-based monomer, wherein:
    the A-B block copolymer has a number average molecular weight of equal to or less than 100,000 and a polydispersity index (weight average molecular weight/number average molecular weight) of not greater than 1.7,
    the polymer block A has a number average molecular weight of equal to or greater than 22,000, an acid value of 0 to 30 mgKOH/g and a glass transition point of not higher than 60° C,
    the polymer block B has an acid value of 75 to 250 mgKOH/g, and
    the A-B block copolymer has been neutralized with an alkaline material, and has been allowed to self-emulsify in an aqueous medium to form emulsion particles having a number average particle size of 30 to 300 nm.

2. A water-based inkjet pigment ink comprising a pigment and a film-forming binder, wherein:
    the film-forming binder is the emulsion binder according to claim 1.

3. The water-based inkjet pigment ink according to claim 2, wherein:
    pigment is at least one pigment selected from the group consisting of Color Index Numbers (C.I.) Pigment Blue 15:3 and 15:4; C.I. Pigment Red 122 and 269; C.I. Pigment Violet 19; C.I. Pigment Yellow 74, 155, 180 and 183; C.I. Pigment Green 7, 36 and 58; C.I. Pigment Orange 43; C.I. Pigment Black 7; and C.I. Pigment White 6, and has a number average primary particle size of smaller than 350 nm, and based on 100 mass % total amount of the ink, the pigment is contained at a content of 4 to 15 mass % and the film-forming binder is contained at a content of 5 to 20 mass %.

4. A process for producing the emulsion binder according to claim 1, comprising the following step:
    subjecting the (meth)acrylate-based monomer to living radical polymerization by using at least an iodine compound as a polymerization initiator compound, thereby synthesizing the A-B block copolymer.

5. The process according to claim 4, wherein the A-B block copolymer is synthesized using, as a catalyst, at least one compound selected from the group that consists of phosphorus-containing compounds consisting of phosphorus halides, phosphite-based compounds and phosphinate compounds, nitrogen-containing compounds consisting of imide-based compounds, oxygen-containing compounds consisting of phenol-based compounds, and hydrocarbon compounds consisting of diphenyl methane-based compounds and cyclopentadiene-based compounds.

6. The process according to claim 4, wherein the living radical polymerization is conducted at a polymerization temperature of 30 to 50° C.

7. The process according to claim 4, wherein subsequent to the living radical polymerization in a water-soluble organic solvent, an alkaline material is added for neutralization, and water is then mixed to induce self-emulsification of the A-B block copolymer.

* * * * *